United States Patent [19]
Todo et al.

[11] Patent Number: 5,498,121
[45] Date of Patent: Mar. 12, 1996

[54] ROBOT WHICH IS CAPABLE OF RECEIVING IMPACT LOAD

[75] Inventors: Yoshinori Todo; Masami Sakamoto; Noriaki Ushijima; Akira Sonoda; Yukio Miura; Kyousuke Araki, all of Nagasaki, Japan

[73] Assignee: Director-General of Agency of Industrial Science and Technology, Tokyo, Japan

[21] Appl. No.: 243,320

[22] Filed: May 16, 1994

[51] Int. Cl.⁶ ............................................. B66C 23/72
[52] U.S. Cl. .............................. 414/719; 414/917; 901/48; 74/490.06
[58] Field of Search .................................. 414/729, 719, 414/917; 901/28, 29, 48; 74/490.06

[56] References Cited

U.S. PATENT DOCUMENTS

| | | | |
|---|---|---|---|
| 3,703,968 | 11/1972 | Uhrich et al. | 414/917 X |
| 4,592,697 | 6/1986 | Tuda et al. | 901/48 X |
| 4,904,150 | 2/1990 | Svensson et al. | 414/719 |
| 4,975,016 | 12/1990 | Pellenc et al. | 414/917 X |

FOREIGN PATENT DOCUMENTS

| 1038219 | 8/1983 | Japan | 414/917 |
|---|---|---|---|

*Primary Examiner*—Donald W. Underwood
*Attorney, Agent, or Firm*—Antonelli, Terry, Stout & Kraus

[57] ABSTRACT

When an impact load is applied to a workpiece which is held by the robot, the impact force can be absorbed. The robot includes a grip 3 for holding a workpiece to which an impact load is applied and a buffer mechanism disposed between the grip 3 and a robot arm 2. The buffer mechanism 4 includes two parallel link mechanisms 5, 6 for enabling the grip 3 to be moved in various directions and hydraulic actuator mechanisms 7, 8 for relaxing the actuation of the parallel link mechanisms 5, 6. When an impact force is applied to the grip 3, two parallel link mechanisms 5, 6 are actuated so that the grip 3 is slightly displaced while the hydraulic actuator mechanisms 5, 6 relax the actuation of the parallel link mechanisms 7, 8. Therefore, the impact force which is applied to the grip 3 can be absorbed. Additionally, after the impact force is applied to the grip 3, the buffer mechanism 4 can immediately be returned automatically to the initial position.

1 Claim, 6 Drawing Sheets

F I G. 2
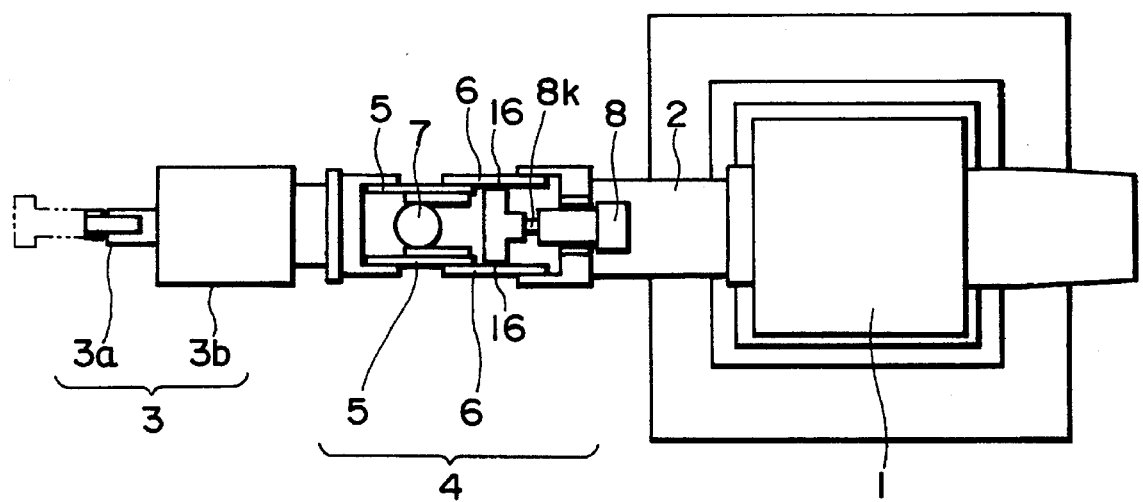

F I G. 3
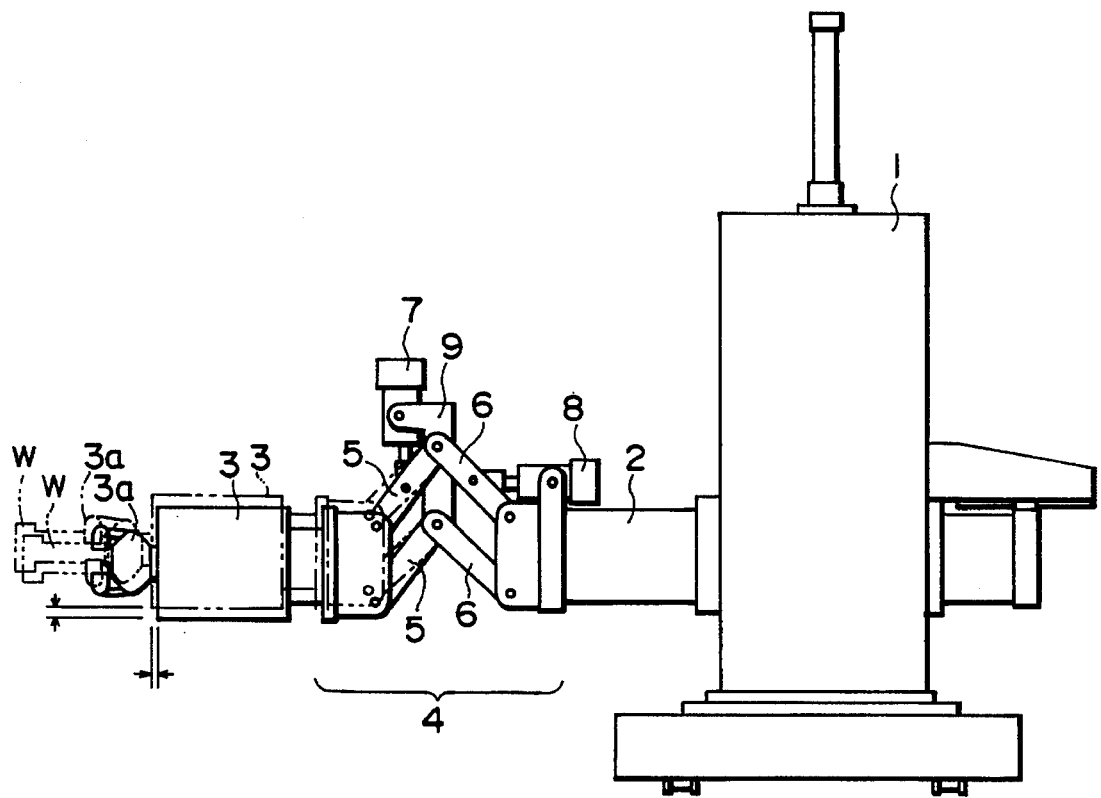

ROBOT WHICH IS CAPABLE OF RECEIVING IMPACT LOAD

BACKGROUND OF THE INVENTION

1. Technical Field

The present invention relates to a robot which is capable of holding a workpiece upon which an impact load is applied in mechanical working such as hammer or press forging.

2. Related Art

Forging, in particular hammer forging has heretofore been carried out manually. There is no handling robot used in this field.

For automation of handling in forging, particularly hammer stamp forging, holding of one end of a workpiece to be forged is required. In this case, the work is momentarily displaced in a vertical direction by an impact force on forging, and a gripped portion of the work is elongated in a horizontal direction.

Accordingly, if an attempt is made to hold a workpiece upon which an impact force is applied with a robot, an excessive bending force or the like would be applied to an arm of the robot or the like, and there is a high probability that the robot may be damaged.

SUMMARY OF THE INVENTION

It is an object of the present invention to provide a robot which can relax or mitigate an impact force applied to a grip or arm for holding a workpiece, to enhance the durability of the robot even if impact loads are applied to the workpiece, and which can automatically return to an initial position to provide a high accuracy of workpiece positioning.

In order to accomplish the object, the present invention provides a robot for holding a workpiece to which an impact load is applied, comprising a main body of the robot; an arm which extends from the main body of the robot; a grip for holding the workpiece; and a buffer mechanism disposed between the arm and the grip for linking them with each other and for relaxing an impact applied to the arm and the grip when the impact load is applied to the workpiece which is held by the grip; the buffer mechanism including a grip side parallel link mechanism which is mounted on one end of the grip on the side of the arm and which includes four link members which are linked with each other via pins so that they form a parallelogram; an arm side parallel link mechanism which is mounted on one end of the arm on the side of the grip and which includes four link members which are linked with each other via pins so that they form a parallelogram; a grip side hydraulic actuator mechanism having an actuating end which is movable for following the plurality of link members forming the grip side parallel link mechanism which abruptly moves when an impact load is applied to the workpiece held by the grip; an arm side hydraulic actuator mechanism having an actuating end which is movable for following of the plurality of link members forming the arm side parallel link mechanism which abruptly moves when an impact load is applied to the workpiece held by the grip; a specific link member of the plurality of link members forming the grip side parallel link mechanism and the arm side link mechanism being commonly used by both mechanisms; a link member of the plurality of link members forming the grip side parallel link mechanism which is parallel with the specific link member being formed of a arm side end of the grip; a link member of the plurality of link members forming the arm side parallel link mechanism which is parallel with the specific link member being formed of a grip side end of the arm; the activating end of the grip side hydraulic actuator mechanism being linked with any one of the link members forming the grip side parallel link mechanism via pins, the actuating end of the arm side hydraulic actuator mechanism being linked with any one of the link members forming the arm side parallel link mechanism via pins.

It is to be understood that the term "hydraulic actuator" used herein also include pneumatic actuators.

Even if an impact load is applied to the workpiece which is held by the grip, the impact force can be absorbed by the buffer mechanism by forming the robot as mentioned above. Specifically, when the grip is subjected to an impact force, the parallel link mechanism are actuated so that the grip is slightly displaced. Simultaneously with this, the operation of each hydraulic cylinder is also actuated to prevent an excessively large force from being applied to the grip and the arm. As a result, the impact force applied to the grip and the arm can be absorbed.

It is essential that each link mechanism be a so-called parallel four link mechanism with respect to the displacement of the grip. This is because even if the grip is displaced in an obliquely downward direction with the workpiece being held in a horizontal position, the workpiece is only moved in a parallel direction without changing its orientation owing to the parallel four link mechanism. The horizontal position of the workpiece is maintained. Accordingly, the orientation of the workpiece can be maintained for any direction of the impact force. The workpiece can be subjected to repeated impact load.

In the robot, each of the grip side hydraulic actuator mechanism and the arm side hydraulic actuator mechanism includes an actuator respectively, such as one having a piston, the actuating end connected to the piston, and a cylinder having a casing for reciprocally accommodating the piston therein; a fluid supply source for supplying fluid into the casing; a fluid line which communicates the fluid supply source with the casing of the cylinder of the actuator; and an accumulator which is connected with the fluid line and temporarily reserves the fluid discharged from the casing by the movement of the piston for suppressing the fluctuations in pressure of the fluid in the casing and the fluid line. The fluid line is arranged so that the fluid from the fluid supply source is supplied to spaces which are formed by division of the casing with the piston in the cylinder. The fluid supply source is adapted to normally supply the spaces in the casing with fluid at a given pressure so that the piston is returned to an original position prior to application of an impact load even if the impact load is applied to the workpiece for actuating the link mechanisms so that the pistons are moved in the casings.

By arranging the grip side hydraulic actuator mechanism and the arm side hydraulic actuator mechanism in such a manner, the piston can be returned to its original position even if the piston is displaced by the impact force. Accordingly, the workpiece can be returned to its original position even if the grip is displaced by the impact force.

BRIEF DESCRIPTION OF THE DRAWINGS

FIG. 2 is a top view showing the whole of the robot of an embodiment of the present invention;

FIG. 3 is a side view showing the whole of the robot of an embodiment of the present invention, which is subjected to an oblique and downward impact force;

BEST MODE FOR EMBODYING THE INVENTION

Figure 1:
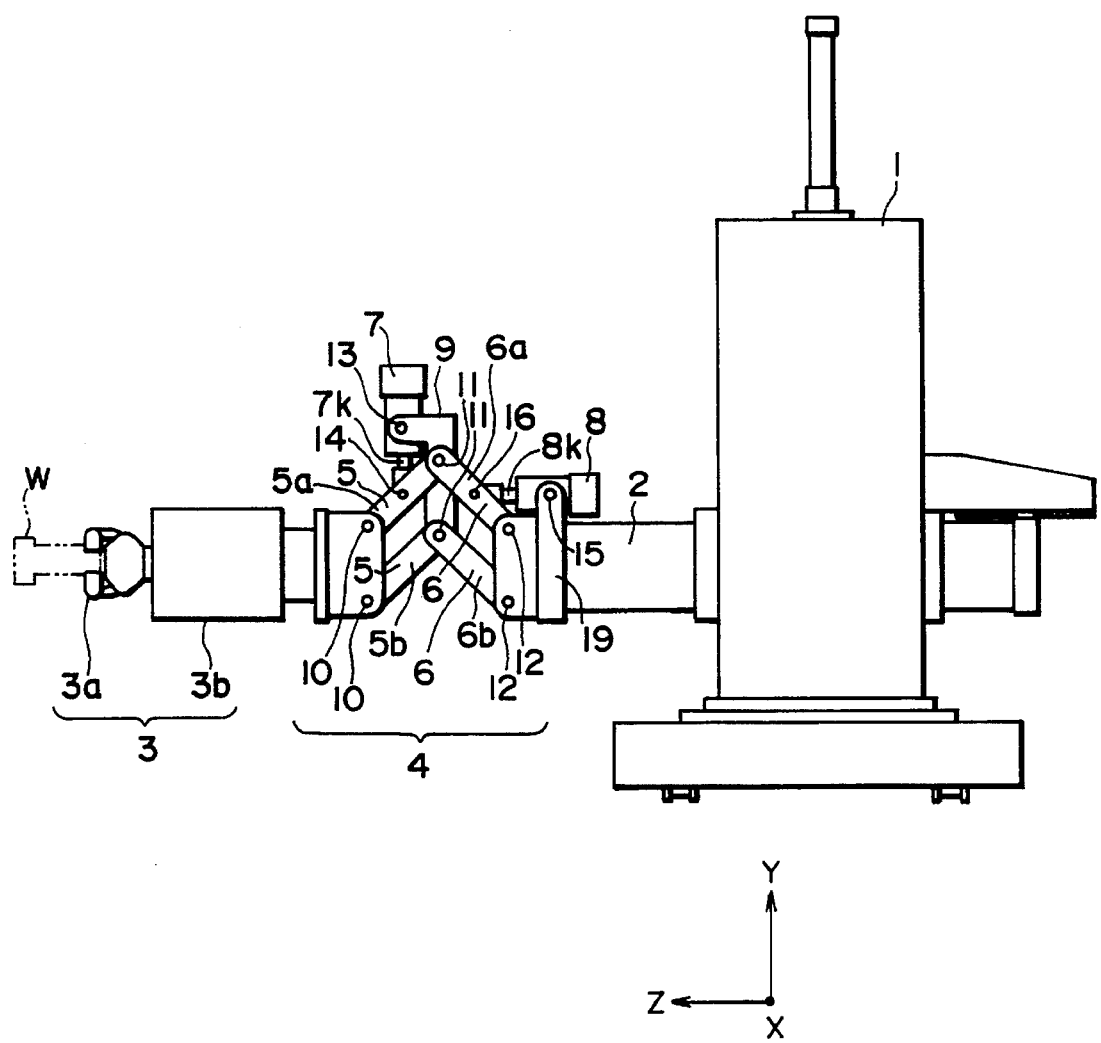
FIG. 1 is a side view showing the whole of a robot of an embodiment of the present invention.

As shown in FIGS. 1 and 2, a robot which is an embodiment of the present invention comprises a main body 1 of the robot which is provided with a control circuit, a power source, etc., an arm 2 which is mounted on the main body 1 of the robot, a grip 3 for holding a workpiece W, a buffer mechanism 4 for relaxing an impact which is applied to the arm 2 and the grip 3 when the impact load is applied to the workpiece W which is held by the grip 3.

For clarity of the following description, a horizontal axis is designated as the Z-axis, an axis which is horizontal and perpendicular to the Z-axis is designated as the X-axis and a vertical axis is designated as the Y-axis. It is also assumed that the arm 2 extends along the (+) Z axis and an impact load in a Z-Y plane is to be applied to the workpiece W.

The grip 3 includes a plurality of fingers 3a for holding the workpiece W and a finger support 3b for supporting the plurality of fingers 3a in an operable manner. The grip 3 is provided with a buffering mechanism which is slightly moved in X, Y and Z directions to slightly mitigate the load in these directions. However, the buffering effect of the buffering mechanism 4 between the arm 2 and the grip 3 is larger than that of the buffer mechanism.

The arm 2 is mounted on the robot main body 1 so that it is movable in a vertical direction (along the Y-axis) and is movable forwardly and rearwardly (along the Z-axis).

The buffer mechanism 4 comprises a grip side parallel link mechanism 5 which is mounted on an arm end of the grip 3, a grip side hydraulic actuator mechanism 7, for suppressing the actuation of the grip side parallel link mechanism 5, an arm side parallel link mechanism 6 which is mounted on the grip end of the arm 2 and an arm side hydraulic actuator mechanism 8 for suppressing the actuation of the arm side parallel link mechanism 6.

The parallel link mechanisms 5 and 6 comprise four link members. The link members are linked with each other via pins which are in parallel with the X-axis in such a manner that they form a parallelogram in an Y-Z plane. A given link member 9 (hereinafter referred to as a coupling link member) of the plurality of link members forming parallel link mechanisms 5 and 6 is commonly used by both parallel link mechanisms 5 and 6.

The link member which is parallel with the coupling link member 9 among the plurality of the link members forming the grip parallel link mechanism 5 is formed of the arm end of the grip 3. The remaining two link members 5a, 5b of the plurality of link members forming the grip side parallel link mechanism 5, which are not parallel with the coupling link member 9, are disposed in parallel relationship with each other in upper and lower positions and are linked with the arm side end of the grip 3 via the pins 10 at one end thereof and are linked with the coupling link member 9 via the pins 11 at the other end thereof. The upper and lower link members 5a and 5b are inclined in such a manner that each has one end thereof lower in height than the other end thereof.

The link member which is parallel with the coupling link member 9 among the plurality of link members forming the arm side parallel link mechanism 6 is formed of the grip end of the arm 2. The remaining two link members 6a, 6b of the plurality of the link members forming the arm side parallel link mechanism 6, which are not parallel with the coupling link member 9, are disposed in parallel relationship with each other in upper and lower positions and are linked with the coupling link member via the pins 11 at the one end thereof and are linked with the grip side end of the arm 2 via the pins 12 at the other end thereof. The upper and lower link member 6a and 6b are inclined in such a manner that each has one end thereof lower in height than the other end thereof.

Figure 6:
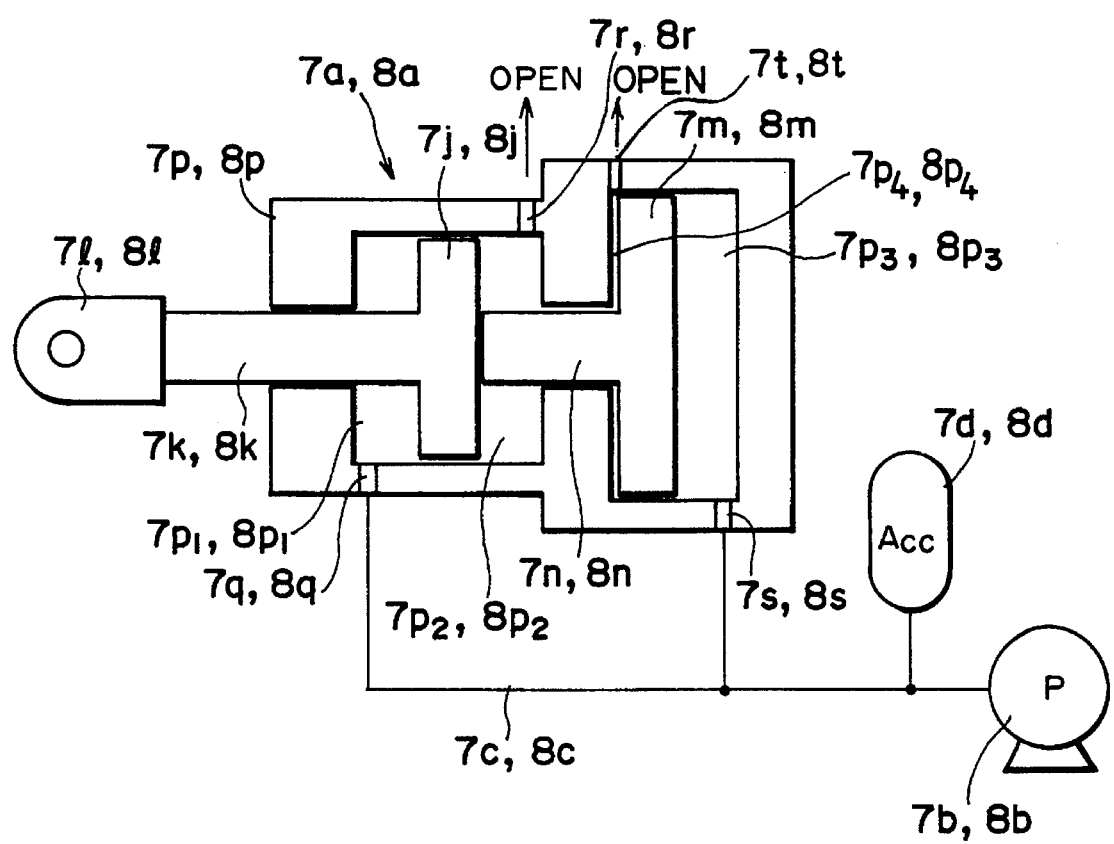
FIG. 6 is a schematic view showing a hydraulic actuator of one embodiment of the present invention.

As shown in FIG. 6, the grip side hydraulic actuator mechanism 7 and the arm side hydraulic actuator mechanism 8 comprise air or hydraulic actuators 7a, 8a, air compressors or hydraulic pumps 7b, 8b for supplying working fluid including gas or liquid to the air or hydraulic actuators 7a, 8a, fluid lines 7c, 8c which connect the hydraulic pumps 7b, 8b with the hydraulic actuators 7a, 8a, and accumulators 7d, 8d which are connected to the fluid lines 7c, 8c, respectively.

The hydraulic actuators 7a, 8a comprise front pistons 7j, 8j, rear pistons 7m, 8m, casings 7p, 8p which reciprocally accommodate the front pistons 7j, 8j and the rear pistons 7m, 8m, front piston rods 7k, 8k which are secured to the front pistons 7j, 8j and have their front ends projecting beyond the casings 7p, 8p, and rear pistons rods 7n, 8n which are secured to the rear pistons 7m, 8m and can be brought into contact with the rear sides of the front pistons 7j, 8j. Each of the spaces within the casing 7p and 8p is divided into four chambers by the front piston 7j, 8j and the rear pistons 7m, 8m, respectively. The casings 7p, 8p are formed with holes 7q, 8q; 7r, 8r; 7s, 8s; 7t and 8t which communicate the inner four chambers with external sides, respectively. Among these holes, the holes 7q, 8q which communicate with the chambers 7p1, 8p1 on the rod side of the front pistons 7j, 8j (hereinafter referred to as front chambers) and the holes 7s, 8s which communicate with chambers 7p3, 8p3 in which there are no rods of the pistons 7m, 8m (hereinafter referred to as rear chambers) are connected with the fluid lines 7c, 8c, respectively.

The chambers $7_{p2}$ $8_{p2}$ and $7_{p4}$, $8_{p4}$ are always open to the atmosphere via the holes 7r, 8r and 7t, 8t respectively.

The accumulators 7d, 8d serve to temporarily reserve the fluid discharged from the casings 7p, 8p by the movements of the front pistons 7j, 8j and/or rear pistons 7m, 8m and to suppress the fluctuations in pressure of the fluid within the casings 7p, 8p and the fluid lines 7c, 8c.

The coupling link 9 of the parallel link mechanisms 5 and 6 is in the form of an inverted L-shape, and the portion corresponding to the bottom extends forward while the portion corresponding to the vertical side extends downward. The link members 5a, 5b, 6a, 6b of the parallel link mechanisms 5, 6 are linked with the portion corresponding to the vertical side of the coupling link 9 via the pins 11. The casing 7p of the grip side hydraulic actuator 7a is linked with the portion of the coupling link 9 corresponding to the bottom side thereof via the pin 13 which is in parallel with the X-axis. The front piston rod 7k of the grip side hydraulic actuator 7a is linked at the front end thereof, that is an operative end 7e, with the upper link member 5a of the grip side parallel mechanism 5 via a pin 14 which is parallel with the X- axis.

A hydraulic actuator support bracket 19 is secured to the end of the arm 2 on the side of the grip. The casing 8p of the arm side hydraulic actuator 8a is linked with the hydraulic actuator support bracket 19 via a pin 15 which is parallel with the X-axis. The front piston rod 8k of the arm side hydraulic actuator 8a is linked at the front end, that is operative end 8e with the upper link member 6a of the arm side parallel link mechanism 6 via a pin 16 which is parallel with the X-axis.

Now, operation of the robot of the present embodiment will be described.

The workpiece W is placed on a die (not shown) and is then held by the grip 3 of the robot. A hammer or press (not shown) is caused to fall upon the workpiece W which is held by the grip 3. When the workpiece W is hit by the hammer, the workpiece W is displaced in a (−)Y direction and is elongated in a (±)Z direction along the die.

When an impact load is applied upon the workpiece W, the robot holding the workpiece W absorbs the displacement and the impact load to some extent with the buffering mechanism of the grip 3 and the buffer mechanism 4 between the grip 3 and the arm 2. In a case where the impact force is large, as is the case when forging a workpiece W with the hammer, unabsorbed displacement and impact force is absorbed by the buffer mechanism 4 between the grip 3 and the arm 2.

When the grip 3 is about to be abruptly displaced due to the impact force, the parallel link mechanisms 5, 6, which form the buffer mechanism 4, are actuated to displace the grip 3 in a direction in which the grip 3 is forced and simultaneously to correspondingly displace the operative end 7e, 8e of the hydraulic actuator mechanisms 7, 8 for absorbing the impact force applied to the grip 3.

Figure 4A:
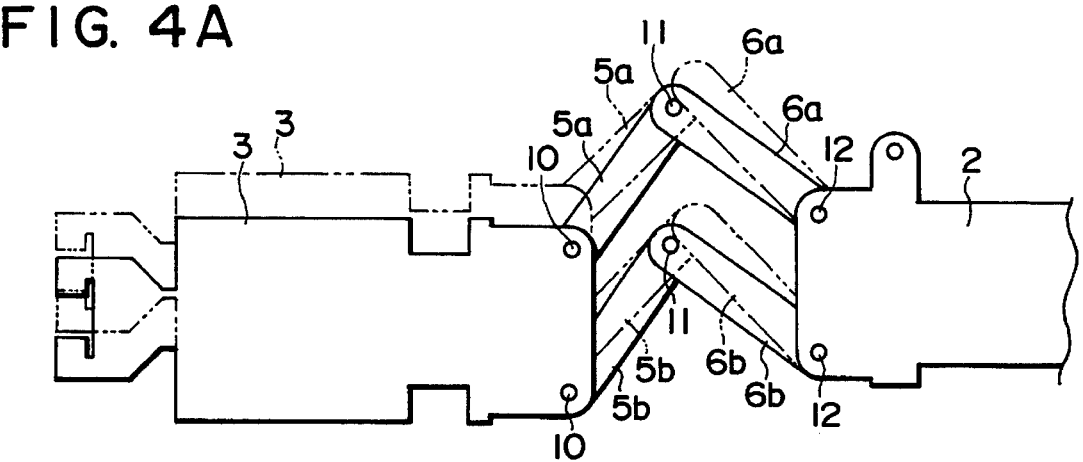
FIG. 4A is an enlarged side view showing the operation of the robot which is subjected to a downward impact force.

Specifically, when the grip 3 is about to be displaced downward due to the impact force as shown in FIG. 4A, the piston rods 7k, 8k of the actuators 7a, 8a extend so that inclination angles of the link member 5a, 5b of grip side parallel link mechanism 5 become larger while inclination angles of the link members 6a, 6b of the arm side parallel link mechanism 6 become smaller. As a result, the grip 3 is displaced downwards while it maintains its horizontal orientation and elevational level.

Figure 4B:
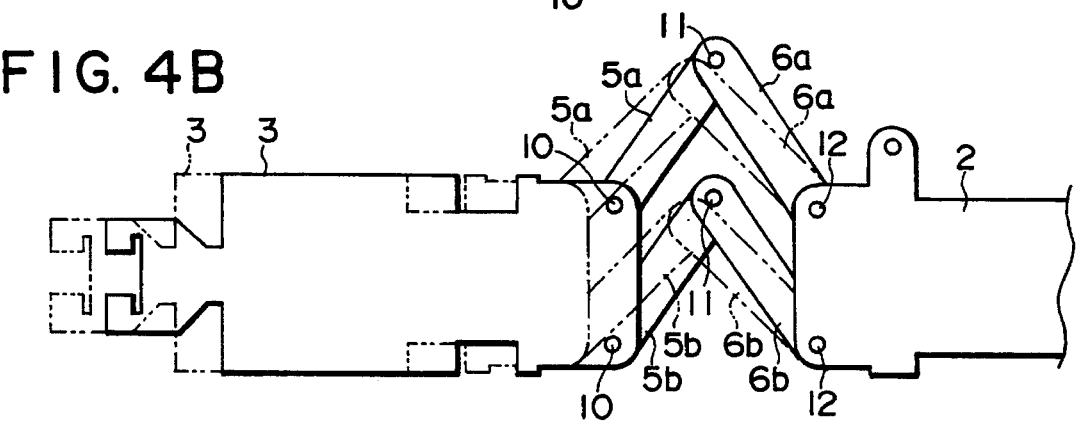
FIG. 4B is an enlarged side view showing the operation of the robot which is subjected to a horizontal impact force.

When the grip 3 is about to be displaced in a (−) Z direction due to the impact force as shown in FIG. 4B, the piston rod 7k of the grip side actuator 7a extends and the piston rod 8k of the arm side actuator 8a retracts so that inclination angles of the link members 5a, 5b of the grip side parallel link mechanism 5 become larger and inclination angles of the link members 6a, 6b of the arm side parallel link mechanism 6 also become larger. As a result, the grip 3 is displaced backwards while it maintains its horizontal orientation and elevational level.

If the spacing between the pins 10 and 11 is equal to that between the pins 11 and 12 in this case, the inclination angles of the grip side link members 5a, 5b would be equal to those of the arm side link members 6a, 6b.

Figure 4C:
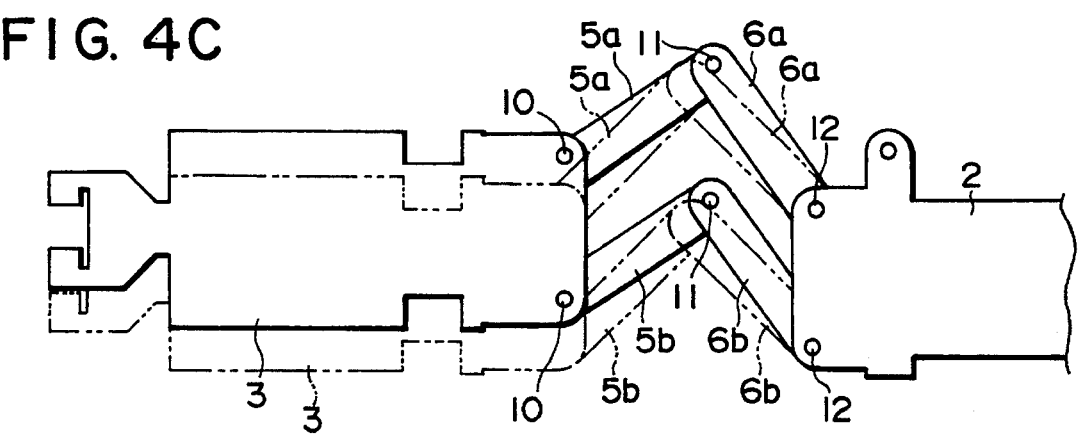
FIG. 4C is an enlarged side view showing the operation of the robot which is subjected to an upward impact force.

When an attempt is made to displace the grip 3 upwards due to application of an impact force as shown in FIG. 4C, the piston rods 7k, 8k of the actuators 7a, 8a retract so that the inclination angles of the link members 5a, 5b of the grip side link mechanism 5 become smaller while the inclination angles of the link members 6a, 6b of the arm side parallel link mechanism 6 become larger. As a result, the grip 3 is displaced upwards while it maintains its horizontal orientation and elevational level.

When the grip 3 is subjected to an impact force including (−)Z and (−)Y direction components, that is the impact force from a front and upper position as shown in FIG. 3, the piston rod 7k of the grip side actuator 7a extends so that the grip 3 is displaced backwards and downwards.

Now, operation of the hydraulic actuator mechanisms 7, 8 when the grip 3 is subjected to the impact force will be described.

At a phase in which the workpiece W is gripped by the grip 3, hydraulic pressure which is applied to the hydraulic actuator 7a, is adjusted so that the front and rear pistons 7j and 7m within the hydraulic actuator 7a rest at an initial position. In other words, fluid at a given pressure is supplied to the front and rear chambers 7p1 and 7p3 of the hydraulic actuator 7a so that the front piston 7j rests at such a position that it is movable forwards and backwards as viewed in FIG. 6 (forward and backward directions are assumed to be left and right directions, respectively in the drawing) by an equal distance and so that the rear piston 7m rests in such a position that it is movable only backwards.

At this time, the front piston 7j abuts on the front end of the rear piston 7m.

For example, when the grip 3 is subjected to the impact force so that a drawing force is applied to the front piston rod 7k, the front piston 7j is moved forwards to cause the fluid in the front chamber 7p1, to be discharged, and the discharged fluid is then absorbed by the accumulator 7d. When the grip 3 is subjected to the impact force so that a pressing force is applied to the front piston rod 7k, the front and rear pistons 7j and 7m are moved backwards so that fluid is supplied into the front chamber 7p1 while fluid is forcedly discharged from the rear chamber 7p3. Even if a force which will act to abruptly move the pistons 7j, 7m is applied thereto in these cases, fluid is charged to or discharged from the front chamber $7_{p3}$, or the rear chamber $7_{p3}$ at a high rate, that is, the piston 7j, 7m and the operative end 7e are abruptly moved to reduce the impact force applied to the grip 3 and the arm 2.

The accumulator 7d also serves to smother the charge to and the discharge from the front and rear chambers $7_{p1}$ and $7_{p3}$ for reducing the resistance and simultaneously for suppressing the fluctuations in pressure.

After the grip 3 is subjected to an impact force so that pistons 7j, 7m are moved, the pistons 7j, 7m are returned to the initial position. This is due to the fact that hydraulic pressure which will maintain the front and rear pistons 7j and 7m in the initial position is normally applied to the front and rear chambers 7p1 and 7p3 of the hydraulic actuator 7a. As a result, the grip 3 will be returned to the initial position as mentioned above, even if the grip 3 is displaced due to an impact force.

Figure 5:
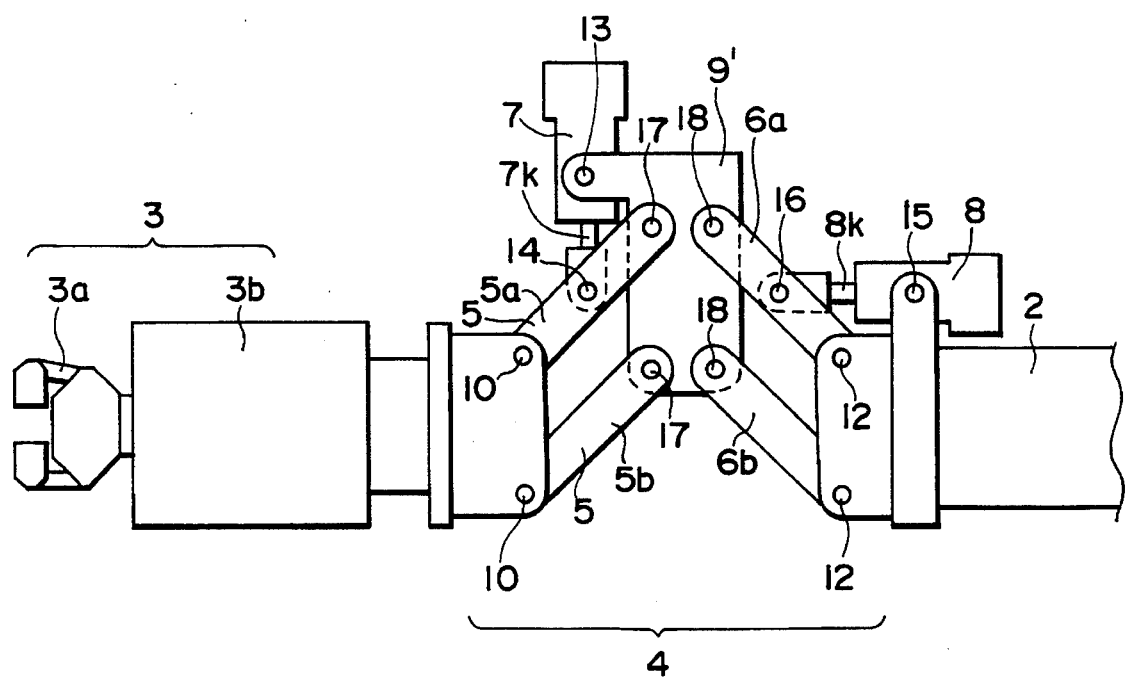
FIG. 5 is a side view showing an embodiment of a buffer mechanism of the present invention.

It is to be understood that the present invention is not limited to only the above mentioned embodiment and that various modifications and alternations can be made within the spirit and scope of the invention. For example, although the rear end portions of the grip side link members 5a, 5b intersect with the front end portions of the arm side link members 6a, 6b and are linked with the coupling link 9 with the same link pins 11 in the embodiment, they may be linked with the coupling link member 9' with separate link pins 17, 18 as shown in FIG. 5.

Although the grip side actuator 7a is supported by the coupling link 9 in the embodiment, it may be supported on the rear end portion of the grip 3. Although the arm side actuator 8a is supported on the front end portion of the arm 2, it may be supported on the coupling link 9.

What is claimed is:

1. A robot for holding a workpiece to which an impact load is to be applied, said robot comprising a main body member; an arm extending from said main body member; a grip member, for holding a workpiece; and a buffer mechanism linking said arm and said grip member, for relaxing an impact applied to said arm and said grip member when an impact load is applied to the workpiece with the workpiece held by the said grip member, wherein:

said buffer mechanism includes:

(a) a plurality of pins;

(b) a grip side parallel link mechanism mounted on one end of said grip member, on the side of said grip member toward said arm, said grip side parallel link mechanism including four grip side link members linked with each other by at least some of said plurality of pins to form a parallelogram;

(c) an arm side parallel link mechanism mounted on one end of said arm, on the side of said arm toward said grip member, said arm side parallel link mechanism including four arm side link members linked with each other by at least some of said plurality of pins to form a parallelogram;

(d) a grip side hydraulic actuator mechanism for restraining movement of said plurality of grip side link members as said grip member abruptly moves when the impact load is applied to the workpiece with the workpiece held by said grip member;

(e) an arm side hydraulic actuator mechanism for restraining movement of said plurality of arm side link members as said grip member abruptly moves when the impact load is applied to the workpiece with the workpiece held by said grip member; and (f) one of said grip side link members being common with one of said arm side link members; one of said grip side link members being parallel with said common link member and being formed of one end of said grip member on the side of said grip member toward said arm; one of said arm side link members being parallel with said common link member and being formed of one end of said arm on the side of said arm toward said grip member;

each of said grip side hydraulic actuator mechanism and said arm side hydraulic actuator mechanism includes:

(a) a front piston, a front piston rod extending in a forward direction from said front piston, a front piston actuating end secured to the forward end of said front piston rod, a rear piston positioned rearwardly of said front piston, a rear piston rod extending in the forward direction from said rear piston, and a casing positioning said front piston and said rear piston to allow reciprocal forward-and-rearward movements thereof and permitting said rear piston rod to contact said front piston;

(b) a fluid supply source;

(c) a fluid line connected to said fluid supply source; and (d) an accumulator connected with said fluid line for temporarily holding fluid discharged from said casing upon movement of said pistons to suppress fluctuations in pressure of fluid in said casing and said fluid line;

said front piston and said rear piston divide the interior of said casing into a front chamber forward of said front piston, an intermediate chamber between said front piston and said rear piston, and a rear chamber rearward of said rear piston;

said casing has an atmosphere opening communicating said intermediate chamber with the exterior of said casing, a first fluid connection coupling said front chamber to said fluid line, and a rear fluid connection coupling said rear chamber to said fluid line so that fluid from said fluid supply source is supplied to said front chamber and said rear chamber;

said fluid supply source is adapted to normally supply said front chamber and said rear chamber with fluid at a given pressure so that said pistons are returned to given positions prior to application of the impact load to the workpiece, even if the impact load is applied to the workpiece to actuate said link mechanisms so that said pistons are moved in said casing;

said grip side hydraulic actuator mechanism actuating end is linked by one of said pins with a first one of said grip side link members, and said grip side hydraulic actuator mechanism casing is linked by one of said pins with a second one of said grip side link members; and said arm side hydraulic actuator mechanism actuating end is linked by one of said pins with a first one of said arm side link members, and said arm side hydraulic actuator mechanism casing is linked by one of said pins with a second one of said arm side link members.

* * * * *